US005105777A

United States Patent [19]

Kronich et al.

[11] Patent Number: 5,105,777

[45] Date of Patent: Apr. 21, 1992

[54] METAL HEAD GASKET WITH PUSH ROD GUIDES

[75] Inventors: Peter G. Kronich, Sheboygan; Donald A. Brunner, New Holstein, both of Wis.

[73] Assignee: Tecumseh Products Company, Tecumseh, Mich.

[21] Appl. No.: 196,305

[22] Filed: May 20, 1988

[51] Int. Cl.[5] .......... F02F 11/00; F16J 15/08

[52] U.S. Cl. .......... 123/193.3; 277/235 B

[58] Field of Search .......... 277/235 B; 123/193 CH, 123/193 P, 193 C; 411/11

[56] References Cited

U.S. PATENT DOCUMENTS

| | | | |
|---|---|---|---|
| 1,368,522 | 2/1921 | Newcomb | 123/193 CH |
| 1,587,626 | 6/1926 | Bailey . | |
| 2,191,050 | 2/1940 | Trice . | |
| 2,695,186 | 11/1954 | Balfe . | |
| 2,771,869 | 11/1956 | Leach | 123/193 CH |
| 2,775,963 | 1/1957 | Kinney et al. | 123/193 CH |
| 2,781,687 | 2/1957 | Knocke | 411/11 |
| 3,053,544 | 9/1962 | Gorsica . | |
| 3,091,472 | 5/1963 | Balfe . | |
| 3,521,607 | 7/1970 | Wiseman et al. | 123/193 CH |
| 3,664,676 | 5/1972 | Petersen . | |
| 3,784,212 | 1/1974 | Doerfling . | |
| 3,843,141 | 10/1974 | Kuhn | 277/235 BX |
| 3,874,675 | 4/1974 | Belter et al. . | |
| 3,949,715 | 4/1976 | Faix et al. | 123/193 CHX |
| 3,973,547 | 8/1976 | Weiss | 123/193 CH |
| 4,140,323 | 2/1979 | Jacobs . | |
| 4,203,608 | 5/1980 | Nicholson . | |
| 4,242,948 | 1/1981 | Stang et al. | 123/193 PX |
| 4,272,085 | 6/1981 | Fujikawa et al. . | |
| 4,290,616 | 9/1981 | Nicholson . | |
| 4,335,890 | 6/1982 | Nicholson . | |
| 4,372,564 | 2/1983 | Nicholson . | |
| 4,390,185 | 6/1983 | Nicholson . | |
| 4,451,051 | 5/1984 | Nicholson . | |
| 4,468,044 | 8/1984 | Ulmer et al. . | |
| 4,471,968 | 9/1984 | Schlaupitz et al. . | |
| 4,480,844 | 11/1984 | Kozerski . | |
| 4,494,491 | 1/1985 | Takada et al. . | |
| 4,548,127 | 10/1985 | Dunn et al. | 123/193 PX |
| 4,571,133 | 2/1986 | Lindow | 411/11 |
| 4,601,267 | 7/1986 | Kronich . | |

FOREIGN PATENT DOCUMENTS

| | | | |
|---|---|---|---|
| 1202563 | 10/1965 | Fed. Rep. of Germany . |
| 3543641 | 4/1987 | Fed. Rep. of Germany . |
| 3724862 | 2/1988 | Fed. Rep. of Germany . |
| 557237 | 11/1943 | United Kingdom . |

*Primary Examiner*—Allan N. Shoap

*Attorney, Agent, or Firm*—Baker & Daniels

[57] ABSTRACT

In an air cooled overhead valve internal combustion engine, a metal gasket plate is disposed between the cylinder portion and the cylinder head. The metal gasket plate includes apertures for receiving the push rods therethrough and guide tabs disposed on opposite sides of the push rod for controlling lateral displacement of the push rods. The metal gasket plate includes adjacent annular stepped portions extending alternately in opposite directions out of the plane of the gasket plate adjacent the periphery of the aperture. Cylinder head bolts are received through the cylinder head and threadedly received in the cylinder portion and pass through the metal gasket plate. Dish shaped spring washers are provided between the cylinder head and the underside of the head portion of the cylinder head bolts. The cylinder head bolts are tightened into the cylinder portion sufficiently to partially compress the spring washers such that the spring washers maintain substantially constant compressive force between the cylinder head and the cylinder portion on the metal gasket plate throughout thermal cycling of the engine. Leakage of the cylinder head gasket which might otherwise occur as a result of temperature induced expansion and contraction of the engine is thereby avoided.

14 Claims, 2 Drawing Sheets

METAL HEAD GASKET WITH PUSH ROD GUIDES

BACKGROUND OF THE INVENTION

The present invention relates generally to a head gasket for an air cooled overhead valve internal combustion engine.

Air cooled overhead valve internal combustion engines include a cylinder portion and a cylinder head which are bolted together. The cylinder portion includes a cylinder bore opening to an end face and a push rod cavity spaced from and generally parallel to the cylinder bore and opening to the end face of the cylinder portion. The cylinder head includes a combustion chamber forming the top of the cylinder bore, an intake valve and an exhaust valve communicating the combustion chamber with intake and exhaust ports, respectively, valve springs, rocker arms, and a push rod cavity. The combustion chamber and push rod cavity of the cylinder head open to an end face in alignment with their counterparts in the cylinder portion. A gasket is provided between the end faces of the cylinder portion and the cylinder head to seal the interface therebetween.

Cylinder head gaskets for an internal combustion engine as described above have conventionally been constructed of a compressible yet resilient material. When the cylinder head is bolted onto the cylinder portion, the head gasket is compressed therebetween with the opposite surfaces of the head gasket intimately engaging the end faces of the cylinder portion and cylinder head to fill any minor surface irregularities therein and effect a high pressure seal between the cylinder portion and cylinder head.

The sealing effectiveness of the conventional head gasket over time depends in large part on its ability to remain resilient in the presence of high temperatures and repeated thermal cycling. As the engine is operated, the cylinder portion, cylinder head, connecting bolts and other metal members of the engine adjacent the head gasket undergo temperature induced expansion and contraction. Consequently, the compression load on the head gasket induced by the bolts connecting the cylinder head to the cylinder portion varies with the temperature of the engine and thus the head gasket must expand resiliently to maintain a high pressure seal.

It has been appreciated that a head gasket made of metal, particularly a relatively soft metal such as aluminum or copper or alloys thereof, provides superior sealing characteristics between the cylinder portion and cylinder head of an internal combustion engine as described above. The superior seal of a metal gasket is obtained due to the malleability of the metal which permits the gasket to readily conform to minor surface irregularities in the end faces of the cylinder portion and cylinder head. Unfortunately, metal head gaskets tend to develop leaks over time as the engine undergoes repeated thermal cycling. Some improvement in the long term sealing capabilities of metal head gaskets has been obtained by the use of local deformations in the gasket to increase the load per unit area on the gasket in such localized areas. This measure by itself, however, has not been wholly satisfactory in curing the problem of metal head gaskets leaking after repeated thermal cycling.

A problem with non-metallic head gaskets is that they function as an insulator between the head and cylinder, thereby blocking effective heat transfer between the hotter head surface and head gasket face and the cooler cylinder gasket surface and cylinder. In the past, metallic gaskets have been used between the head and cylinder surfaces, and in some cases the gaskets have extended outwardly into the cooling fin area of the head and cylinder to thereby be exposed to the cooling air stream of the air cooled engine. However, such prior art gaskets, which were rigidly clamped in place by means of head bolts, leaked after a period of time, and therefore proved to be unfeasible.

It would be desirable to provide means permitting a metal head gasket with its superior initial sealing capability to be used between the cylinder portion and cylinder head of an internal combustion engine while avoiding the problem of gasket leakage which arises due to the relative lack of resilience of a metal head gasket.

It is a characteristic of air cooled overhead valve internal combustion engines that the rocker arm of the valve mechanism is located at a relatively great distance from the cam shaft, with a relatively long push rod connecting the rocker arm to the valve lifter which engages the cam of the cam shaft. Because of the spherical bearing surface of a stamped rocker arm, some means are required for stabilizing the push rod against lateral movement which could cause the rocker arm to pivot about its rocker arm stud, leading to misalignment of the valve mechanism. Prevention of lateral displacement of the push rod has previously been provided by push rod guides in a push rod plate disposed adjacent the rocker arm stud.

SUMMARY OF THE INVENTION

One aspect of the present invention involves a metal gasket plate disposed between the cylinder portion and cylinder head of an air cooled overhead valve internal combustion engine in which a rocker arm push rod extends from within the cylinder portion to within the cylinder head. The metal gasket plate is provided with a pair of guide tabs spaced from one another on opposite sides of the push rod to substantially prevent lateral displacement of the push rod. Another aspect of the present invention involves a metal gasket plate disposed between the cylinder portion and the cylinder head of an air cooled overhead valve internal combustion engine in combination with resilient means disposed beneath the head portions of the cylinder head bolts to provide an improved gasket sealing arrangement wherein substantially constant compression force is maintained on the gasket plate by the resilient means throughout thermal cycling of the engine. The initial sealing effectiveness of the gasket plate is thereby maintained over time. The edges of the head gasket extend outwardly into the cooling fin area of the head and cylinder so that the gasket is exposed to the cooling air stream of the engine. This enables the gasket to function as an additional fin for more effective cooling of both the gasket and the gasket surfaces of the cylinder and the cylinder head, and also allows better heat flow through the gasket between the head and the cylinder block.

Clamping force in retention with the aluminum or copper gaskets is improved in sealing the combustion chamber under load since the thermal coefficient of expansion of both copper and aluminum is greater than steel and that expansion is proportional with both the temperature and thickness of the gasket. Thus, it allows a thicker gasket to be effectively used since the sealing and clamping force on the gasket will be the greatest in the area of the combustion chamber with its high temperatures and where the maximum sealing force is required and still allow for effective heat transfer out of this area due to the fin cooling of the gasket itself.

The present invention provides a metal head gasket with initial superior sealing capability and maintains that sealing capability over time by counteracting the effects of temperature induced expansion and contraction of the engine which could otherwise lead to leaking of a metal head gasket after repeated thermal cycling. By permitting a metal head gasket to be used successfully in such an engine, the present invention in another aspect thereof also provides push rod guides in the head gasket, thereby eliminating an additional part which is usually located on the cylinder head adjacent the rocker arm stud.

The invention, in one form thereof, provides in an air cooled overhead valve internal combustion engine a metal head gasket disposed between the cylinder portion and the cylinder head. The metal gasket has a push rod aperture therein receiving the push rod therethrough. The metal gasket further includes a pair of guide tabs spaced from one another on opposite sides of the push rod, with the pair of guide tabs upstanding from the gasket plate.

The invention further provides, in one form thereof, in an air cooled overhead valve internal combustion engine a system for sealing the cylinder portion to the cylinder head. The sealing system includes a metal gasket plate disposed between the cylinder portion and the cylinder head, with the gasket plate including an aperture aligned with and substantially the diameter of the cylinder bore. The edge portions of the gasket extend outwardly into the cooling fin area and into the cooling air stream. A cylinder head bolt having a head portion and a shank portion has the shank portion received through the cylinder head and threadedly received in the cylinder portion. Resilient means received about the shank portion of the cylinder head bolt between the head portion thereof and the cylinder head maintains substantially constant compression force on the gasket plate between the cylinder head and the cylinder portion throughout thermal cycling of the engine It is a feature of the present invention to provide an improved gasket seal between the cylinder portion and cylinder head of an internal combustion engine.

It is a further feature of the present invention to provide a gasket between the cylinder portion and cylinder head of an internal combustion engine where the gasket includes push rod guides for controlling lateral displacement of the push rods.

Further features and advantages of the present invention will become apparent from the following description.

DESCRIPTION OF A PREFERRED EMBODIMENT

Figure 1:
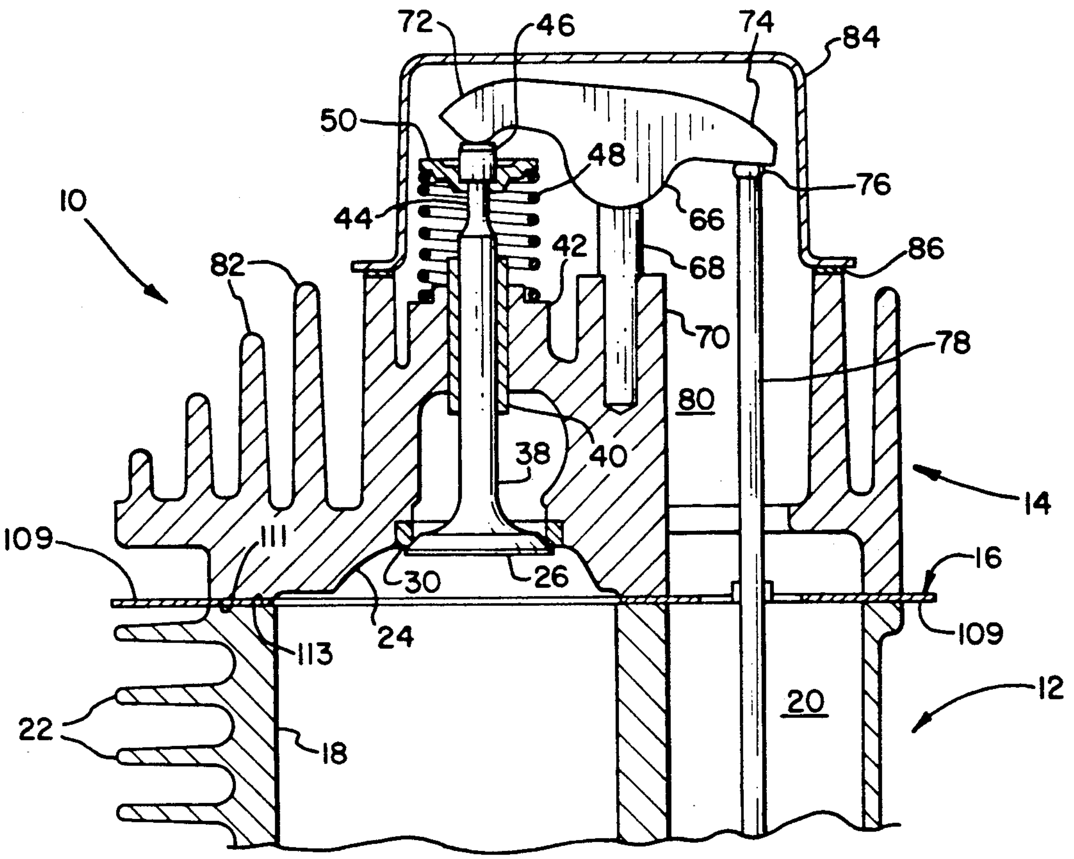
FIG. 1 is a sectional view of the cylinder head portion of an air cooled overhead valve internal combustion engine in a plane through the rocking plane of the intake valve rocker arm.
Figure 2:
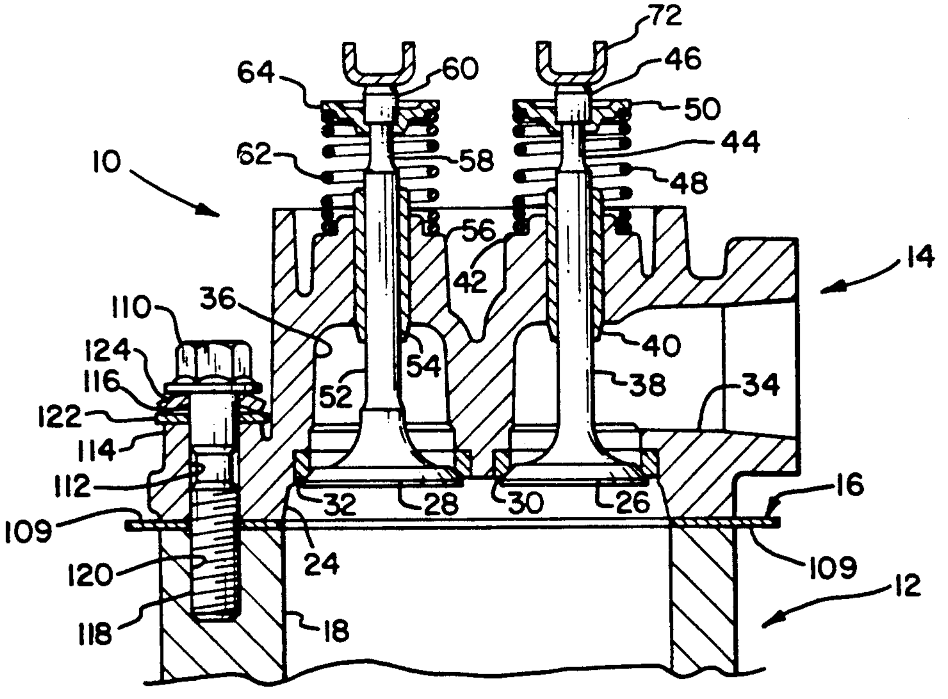
FIG. 2 is a sectional view of the engine of FIG. 1 through the plane of the valve stems.

Referring in particular to FIGS. 1 and 2, there is illustrated an overhead valve engine 10 including a cylinder portion 12 and a cylinder head 14 whose interface is sealed by aluminum or copper head gasket 16. Gasket 16 may have a thickness of about 0.026 in.-0.100 in. Cylinder portion 12 includes a cylindrical cylinder bore 18, push rod cavity 20 and a plurality of integral cooling fins 22. Cylinder head 14 includes combustion chamber 24 aligned with and in communication with cylinder bore 18. Intake valve 26 and exhaust valve 28, seated on valve seats 30 and 32, respectively, provide for selective communication between combustion chamber 24 and intake port 34 and exhaust port 36, respectively. Intake valve 26 includes valve stem 38 slidingly received in bearing bushing 40 fitted within boss 42 of cylinder head 14. Valve stem 38 includes a reduced neck portion 44 and an end portion 46. Intake valve spring 48 engages boss 42 at one end thereof and valve spring keeper 50 at the other end thereof. Valve spring keeper 50 engages the underside of end portion 46 adjacent neck portion 44 with intake valve spring 48 disposed in compression between boss 42 and valve end portion 46, whereby intake valve 26 is urged against valve seat 30. Likewise, exhaust valve 28 includes valve stem 52 slidingly received within bearing bushing 54 fitted in boss 56 of cylinder head 14. Valve stem 52 includes a reduced neck portion 58 and an end portion 60. Exhaust valve spring 62 engages boss 56 at one end thereof and valve spring keeper 64 at the other end thereof. Valve spring keeper 64 engages the underside of end portion 60 adjacent neck portion 58 with exhaust valve spring 62 disposed in compression between boss 56 and end portion 60, whereby exhaust valve 28 is urged against valve seat 32.

Rocker arm 66 is pivotally mounted to rocker arm stud 68 received in rocker arm support boss 70 of cylinder head 14. Rocker arm 66 includes an end 72 in engagement with the top of end portion 46 of valve stem 38. End 74 of rocker arm 66 engages ball shaped end 76 of push rod 78. Cylinder head 14 includes push rod cavity 80 which is aligned with and in communication with push rod cavity 20 of cylinder portion 12. The end of push rod 78 opposite end 76 engages a tappet actuated by a cam on a cam shaft (not shown). Cylinder head 14 further includes integral cooling ribs 82 and rocker arm cover 84 secured thereto by conventional attachment means such as threaded bolts and sealed by rocker arm cover gasket 86.

Figure 3:
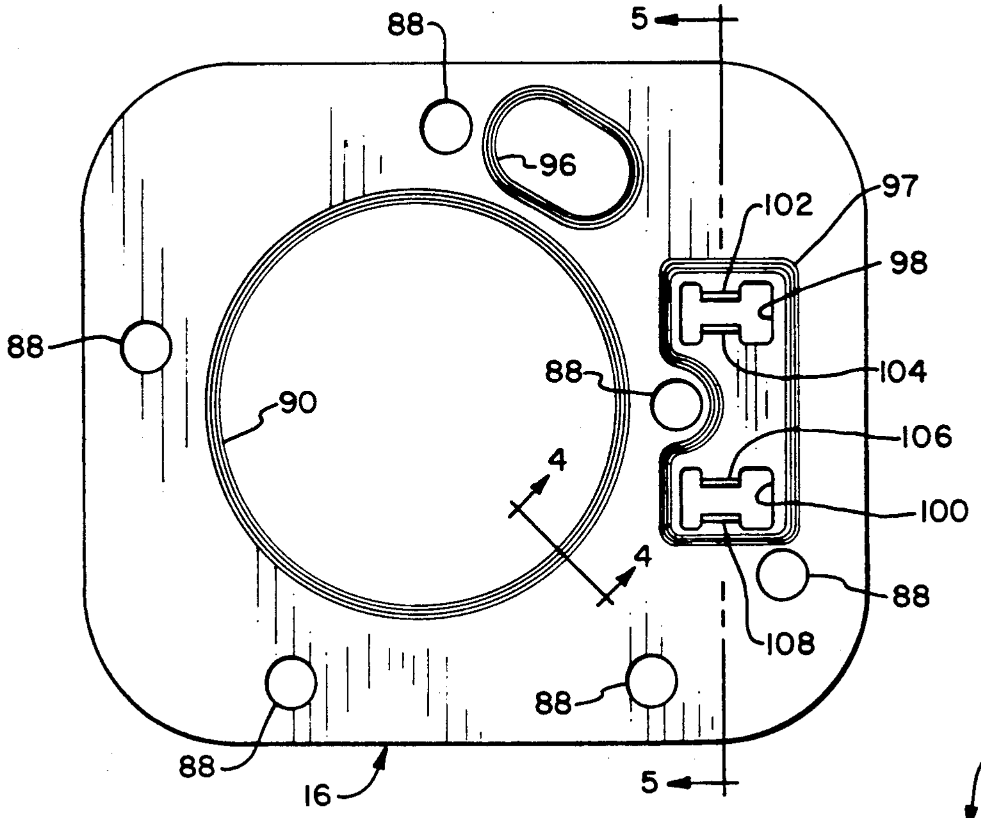
FIG. 3 is a top plan view of the head gasket of the engine of FIG. 1.
Figure 5:
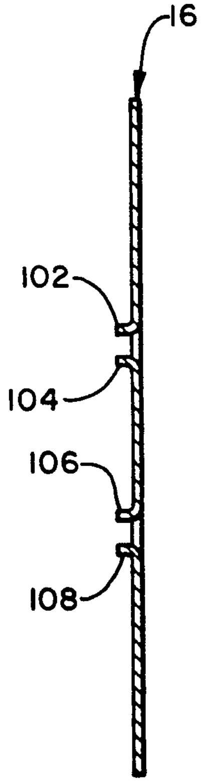
FIG. 5 is a cross-sectional view of the head gasket of FIG. 3 taken along section line 5—5 in FIG. 3.
Figure 4:
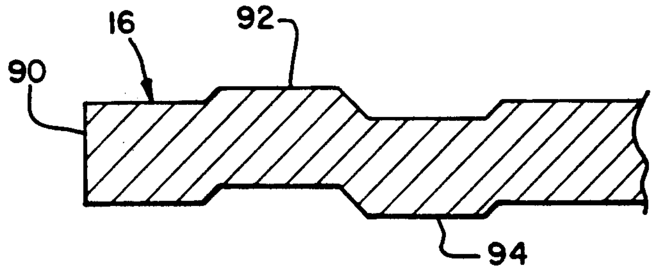
FIG. 4 is an enlarged cross-sectional view of the head gasket of FIG. 3 taken along section line 4—4 in FIG. 3.

Referring to FIGS. 1-5, and particularly to FIGS. 3-5, head gasket 16 is a metal plate preferably made of aluminum or aluminum alloy and including bolt holes 88 for accommodating the head bolts 110 (described further below) employed for attaching cylinder head 14 to cylinder portion 12. Head gasket 16 includes a round aperture 90 aligned with and substantially corresponding in diameter to cylinder bore 18. In the immediate vicinity of the periphery of aperture 90, head gasket 16 is deformed or embossed to provide alternate annular stepped portions 92 and 94 protruding from opposite faces thereof out of the plane of gasket plate 16. An oil passageway 96 is likewise provided with similar alternate annular stepped portions in the vicinity of the periphery thereof conforming to the peripheral shape thereof. Alternate annular stepped portions 97 also circumscribe apertures 98 and 100 described below. Embossed areas 92, 94 and those associated with oil passageway 96 and apertures 98 and 100 extend out of the planes of the opposite sides of gasket 16 0.003 in.–0.005 in.

Head gasket 16 includes a pair of apertures 98 and 100 positioned for receiving push rod 78 corresponding to intake valve 26 and the push rod corresponding to exhaust valve 28, respectively. Extending inwardly into aperture 98 in the plane of head gasket 16 and extending upwardly from the plane of head gasket 16 are push rod guide tabs 102 and 104. Likewise, similarly shaped push rod guide tabs 106 and 108 are associated with aperture 100. Push rod guide tabs 102–108 extend lengthwise in a direction generally parallel to the rocking plane of rocker arm 66 and are aligned with each other along a line generally perpendicular to the rocking plane of rocker arm 66 such that each pair of guide tabs 102 and 104, and 106 and 108 are disposed on either side of a respective push rod. In this orientation lateral movement of the push rods perpendicular to the rocking plane of the rocker arms is restricted while lateral movement of the push rods in the rocking plane of the rocker arms incidental to the rocking motion of the rocker arms is permitted. Apertures 98 and 100 are sized large enough to receive therethrough the ball shaped end of the push rods during assembly. However, the space between each respective pair of guide tabs 102 and 104, and 106 and 108 is such that the guide tabs are closely adjacent the push rods after assembly. Tabs 102, 104, 106 and 108 are easily formed by piercing and stamping. With ferric push rods and oil lubrication, no wear problems are encountered between the push rod surface and the gasket push rod guide tabs 102–108. However, if aluminum push rods are used, any incompatability of sliding surface contact can easily be overcome by anodizing or plating the tab surface of the gasket or the aluminum push rod tube in contact with the gasket guide tabs.

As shown in FIGS. 1 and 2, the peripheral edge portions 109 of gasket 16 extend radially outwardly from the areas where head surfaces 111 and cylinder surfaces 113 are clamped to gasket 116 into the cooling fin area of head 14 and cylinder 12. As is known, in an air cooled engine, cooling air from the blower (not shown) flows downwardly over the cooling fin area of head 14 and cylinder 12 in order to transfer heat from the engine. By extending gasket 16 in the manner provided by the present invention, gasket 16 is cooled, thereby providing better heat transfer between head 14 and cylinder 16.

Referring again in particular to FIG. 2, there is illustrated one of a plurality of head bolts 110 which attach cylinder head 14 to cylinder portion 12 and compress head gasket 16 therebetween. Head bolt 110 is received in smooth bore 112 in boss 114 of cylinder head 14. An upper shank portion 116 of head bolt 110 is unthreaded whereas lower shank portion 118 of head bolt 110 is threaded and received in threaded bore 120 of cylinder portion 112. Disposed atop boss 114 is flat thrust washer 122. A dish shaped spring washer (Belleville washer) 124 is disposed between thrust washer 122 and the underside of the head of head bolt 110. Belleville washer 124 provides a constant downward thrust on cylinder head 14 relative head bolt 110, and hence relative cylinder portion 12. The spring action of Belleville washer 124 accommodates expansion and contraction of cylinder head 14 and cylinder portion 12 during thermal cycling of the engine, thereby maintaining constant compression on head gasket 16 and maintaining the initial sealing capability of head gasket 16 by preventing variation in loading as might otherwise occur during thermal cycling.

While this invention has been described as having a preferred design, it will be understood that it is capable of further modification. This application is therefore intended to cover any variations, uses, or adaptations of the invention, following the general principles thereof and including such departures from the present disclosure as come within known or customary practice in the art to which this invention pertains and fall within the limits of the appended claims.

What is claimed is:

1. In an overhead valve internal combustion engine having a cylinder portion with a cylinder bore, a cylinder head with a valve mechanism including a rocker arm, and a rocker arm push rod extending from within the cylinder portion to within the cylinder head, a head gasket sealingly disposed between the cylinder portion and cylinder head comprising: a metal gasket plate having a push rod aperture therein receiving said push rod therethrough, said gasket plate including a pair of guide tabs spaced from one another on opposite sides of the push rod, the pair of guide tabs upstanding from said gasket plate.

2. The engine of claim 1, in which the pair of guide tabs extend substantially parallel to the rocking plane of said rocker arm and substantially parallel to one another and substantially perpendicular to the plane of said gasket plate.

3. The engine of claim 2, in which the pair of guide tabs are disposed closely adjacent to the push rod to substantially prevent lateral displacement of the push rod in a direction perpendicular to the rocking plane of said rocker arm.

4. The engine of claim 3, in which the pair of guide tabs extend into the push rod aperture in the plane of said gasket plate and the push rod aperture includes a portion having a width in the plane of said gasket plate greater than the space between the pair of guide tabs and sufficient to pass therethrough an enlarged end portion of the push rod.

5. The engine of claim 1, in which the pair of guide tabs extend into the push rod aperture in the plane of said gasket plate and the push rod aperture includes a portion having a width in the plane of said gasket plate greater than the space between the pair of guide tabs and sufficient to pass therethrough an enlarged end portion of the push rod.

6. In an overhead valve internal combustion engine having a cylinder portion with a cylinder bore, a cylinder head with a valve mechanism including a rocker arm, and a rocker arm push rod extending from within the cylinder portion to within the cylinder head, a system for sealing said cylinder portion to said cylinder head and guiding said push rod comprising:

a metal gasket plate disposed between and in contact with the cylinder portion and the cylinder head, said gasket plate including edge portions that extend radially outwardly beyond the cylinder portion and cylinder head in contact therewith, said gasket plate including an aperture aligned with and of substantially the diameter of the cylinder bore, said gasket plate including a push rod aperture therein receiving said push rod therethrough, said gasket plate including a pair of guide tabs spaced from one another on opposite sides of the push rod, the pair of guide tabs upstanding from said gasket plate;

a cylinder head bolt having a head portion and a shank portion, the shank portion received through said cylinder head and threadedly received in said cylinder portion; and resilient means received about the shank portion of said cylinder head bolt between the head portion thereof and said cylinder head for resiliently biasing said cylinder head toward said cylinder portion such that substantially constant compression force is maintained on said gasket plate between said cylinder head and said cylinder portion throughout thermal cycling of said engine.

7. The engine of claim 6, in which the pair of guide tabs extend substantially parallel to the rocking plane of said rocker arm and substantially parallel to one another and substantially perpendicular to the plane of said gasket plate.

8. The engine of claim 7, in which the pair of guide tabs are disposed closely adjacent to the push rod to substantially prevent lateral displacement of the push rod in a direction perpendicular to the rocking plane of said rocker arm.

9. The engine of claim 8, in which the pair of guide tabs extend into the push rod aperture in the plane of said gasket plate and the push rod aperture includes a portion having a width in the plane of said gasket plate greater than the space between the pair of guide tabs and sufficient to pass therethrough an enlarged end portion of the push rod.

10. The engine of claim 6, in which the pair of guide tabs extend into the push rod aperture in the plane of said gasket plate and the push rod aperture includes a portion having a width in the plane of said gasket plate greater than the space between the pair of guide tabs and sufficient to pass therethrough an enlarged end portion of the push rod.

11. The engine of claim 6, and further including a flat thrust washer on said cylinder head received about the shank portion of the cylinder head bolt between said cylinder head and said spring washer.

12. The engine of claim 6, in which said resilient means includes a spring washer.

13. In an overhead valve internal combustion engine having a cylinder portion, a cylinder head and a push rod, a head gasket disposed in sealing engagement with said cylinder portion and said cylinder head comprising: a metal gasket plate having a push rod aperture therein receiving said push rod therethrough, said gasket plate including a pair of guide tabs spaced from one another on opposite sides of the push rod, the pair of guide tabs upstanding from said gasket plate.

14. The engine of claim 13, in which the pair of guide tabs extend substantially parallel to the rocking plane of said rocker arm and substantially parallel to one another and substantially perpendicular to the plane of said gasket plate.

* * * * *